United States Patent
Hudson et al.

(10) Patent No.: US 8,082,499 B2
(45) Date of Patent: Dec. 20, 2011

(54) GRAPHICAL INTERFACE FOR INTERACTIVE DIALOG

(75) Inventors: Casey Hudson, Edmonton (CA); Jim Bishop, Edmonton (CA); Scott Greig, Edmonton (CA); Drew Karpyshyn, Sherwood Park (CA); Kevin Martens, Edmonton (CA); Ray Muzyka, Edmonton (CA); James Ohlen, Austin, TX (US); Yanick Roy, Sherwood Park (CA); Preston Watamaniuk, Edmonton (CA); Michael Laidlaw, Edmonton (CA)

(73) Assignee: Electronic Arts, Inc., Redwood City, CA (US)

( * ) Notice: Subject to any disclaimer, the term of this patent is extended or adjusted under 35 U.S.C. 154(b) by 959 days.

(21) Appl. No.: 11/686,688

(22) Filed: Mar. 15, 2007

(65) Prior Publication Data

US 2007/0226648 A1 Sep. 27, 2007

Related U.S. Application Data

(60) Provisional application No. 60/784,429, filed on Mar. 21, 2006.

(51) Int. Cl.
*G06F 3/01* (2006.01)
(52) U.S. Cl. ........ 715/702; 715/704; 715/705; 715/706; 715/707; 715/708
(58) Field of Classification Search .................. 715/704, 715/702, 705–708
See application file for complete search history.

(56) References Cited

U.S. PATENT DOCUMENTS

| | | | |
|---|---|---|---|
| 3,947,972 A | 4/1976 | Freeman | |
| 4,078,316 A | 3/1978 | Freeman | |
| 4,117,605 A | 10/1978 | Kurland et al. | |
| 4,445,187 A | 4/1984 | Best | |
| 5,340,317 A | 8/1994 | Freeman | |
| 5,358,259 A | 10/1994 | Best | |
| 5,393,070 A | 2/1995 | Best | |
| 5,393,071 A | 2/1995 | Best | |
| 5,393,072 A | 2/1995 | Best | |
| 5,393,073 A | 2/1995 | Best | |
| 5,873,057 A | 2/1999 | Eves et al. | |
| 6,064,383 A * | 5/2000 | Skelly | 715/758 |
| 6,078,326 A * | 6/2000 | Kilmer et al. | 715/834 |
| 6,094,197 A | 7/2000 | Buxton et al. | |
| 6,108,515 A | 8/2000 | Freeman | |
| 6,287,196 B1 | 9/2001 | Kawano | |
| 6,290,602 B1 * | 9/2001 | Kawano | 463/23 |
| 6,397,188 B1 | 5/2002 | Iwasawa | |
| 6,585,593 B1 | 7/2003 | Okano et al. | |
| 6,592,455 B1 | 7/2003 | Okano et al. | |
| 6,722,989 B1 | 4/2004 | Hayashi | |
| 6,798,426 B1 * | 9/2004 | Tateishi | 715/706 |

(Continued)

OTHER PUBLICATIONS

International Search Report for PCT/US2007/064120, Feb. 20, 2008.

*Primary Examiner* — Simon Ke

(57) ABSTRACT

A system and method for creating conversation in a computer program such as a videogame. A plurality of classes of dialog is provided and a conversation segment is assigned to each class. A graphical interface is displayed during operation of the program that provides a choice indicator, wherein the choice indicator has a plurality of selectable slots, each associated with a dialog class. The graphical interface is consistent as to the position of dialog classes throughout at least a segment of the program.

44 Claims, 10 Drawing Sheets

U.S. PATENT DOCUMENTS

| | | |
|---|---|---|
| 6,918,091 B2 | 7/2005 | Leavitt et al. |
| 6,929,547 B2 | 8/2005 | Komata |
| 6,982,716 B2 * | 1/2006 | Kulas ............ 345/473 |
| 2003/0036431 A1 | 2/2003 | Futatsugi et al. |
| 2003/0153380 A1 | 8/2003 | Dreaper |
| 2004/0038739 A1 * | 2/2004 | Wanat ............ 463/36 |
| 2005/0028110 A1 | 2/2005 | Vienneau et al. |
| 2007/0162854 A1 * | 7/2007 | Kikinis ............ 715/719 |
| 2007/0298856 A1 * | 12/2007 | Gilmore et al. ............ 463/16 |

* cited by examiner

GRAPHICAL INTERFACE FOR INTERACTIVE DIALOG

This application is based on, and claims priority to, provisional application having Ser. No. 60/784,429 having a filing date of Mar. 21, 2006 entitled Graphical Interface for Interactive Dialog.

BACKGROUND OF THE INVENTION

Computer programs typically require that, at various stages in the use of the program, a user make selections among options to enable the program to perform the tasks for which it was written. The most common way for options to be presented is an interface comprising lines of text in a menu. Each line of text must be read so that the user can determine which to select among the options for a particular situation or application. Normally, one of the options must be selected before the program undertakes further action. In the most simple case, the selection can be, for example, between "YES" and "NO" answers. In other cases, the user may be asked to select from a longer menu of possible selections. In some cases, it can take a user considerable time to read a long list of options presented in a menu, before making the selection.

Many different types of videogames have been produced, which enable the player to take control of a character in a game situation that involves a storyline. The storyline may progress using simulated conversations. In a role-playing game, the conversations may be held between the player's own character and one or more characters in the game. Using prior art interfaces, typically the conversation progresses through the player making choices between different dialog responses presented as lists of text on-screen. Selection of different responses results in different paths through the conversation or story. Making a dialog choice results in the character "speaking" the chosen line. Sometimes such videogame dialog is implemented by displaying the character's dialog line in the form of text, and at other times it is implemented through playback of pre-recorded lines spoken by a voice actor. In either case, when players are presented with a dialog choice, they are usually required to refer to a text-based description or another set of indicators to understand the available choices. This causes the game play experience of in-game conversations to progress much more slowly than real life conversations. As a consequence the player may become frustrated with the pacing of conversation and with the amount of reading required to engage in conversation, thus reducing the player's enjoyment of the game. In addition, by allowing the player to read the dialog line before selecting it, the player already knows exactly what their character is about to say, reducing the entertainment value of using voice-over.

A real life conversation between persons typically includes sequential and parallel contributions from the participants, verbal and non-verbal, in a substantially continuous manner.

In view of the above, so as to make conversations within a videogame more closely resemble real life conversations, there is a need for an improved method and program by which conversations can be conducted within the playing of videogames or the like, which overcome the deficiencies of prior art interfaces.

Thus, the method of conducting conversations between the player and characters in prior art videogames, or between characters in prior art videogames, gives such conversations characteristics that diminish the player's enjoyment of the videogame. An improved method of conducting conversations within videogames, or other analogous programs, is required to enable such conversations to be conducted in real time and in a manner that closely simulates real life conversations.

To simulate a verbal conversation with other characters within a videogame, an interface is required which can convert controller inputs into specific dialog lines that the player-controlled character will speak. Various approaches to this problem have been implemented in existing videogames.

Some videogames simply list the dialog options that are available to the player at the current point in the conversation. In many prior art videogames, players are presented with an interface comprising a vertical list of dialog lines, written out in their entirety. The player reads through each of the lines, then chooses the one that they wish the character to speak.

Alternatively, players are given a vertical list of "themes" that describe each available dialog line. When a player makes a choice, the player-controlled character is shown speaking the chosen line through the use of voice-over.

Another class of interface sometimes used for videogame dialog is that of a radial menu. In this kind of interface, players can use an analog input such as a thumbstick on a controller to select options placed around the outside of a circle. Players are presented with several dialog options, each represented by a very brief description of its response type. An indicator shows the direction the player must push on the thumbstick to choose a dialog option.

None of the prior art interfaces for programs of which the inventor is aware, and in particular for videogames, allows interaction between the program and the user, or between the videogame and the player, to proceed in a manner and at the pace that closely approaches real life conversations.

SUMMARY OF THE INVENTION

Graphical interfaces and methods are disclosed that can enable a user of a computer program to select among options presented by the program more rapidly than by selection from a menu comprising lines of text in a random order. An embodiment of the graphical interface for use in playing a videogame enables a player to engage in simulated conversations with characters within the videogame that more closely resemble real life conversations than conventional interfaces for videogames, which require excessive reading of on-screen text. The graphical interface provides a set of pre-defined slots for various classes of dialog response, which are associated with separate inputs, allowing the player to learn the locations of the classes of dialog response so that choices can be made rapidly without referring to additional indices. The interface allows the player to instinctively react to the dialog of other in-game characters, enabling a simulated conversation that more closely resembles a real life, real-time conversation. Optionally, a conversation is presented through actual voice recordings for each line, effectively putting the player in control of a real-time, audible conversation.

DESCRIPTION OF THE DRAWINGS

The invention is best understood from the following detailed description when read with the accompanying drawings

Embodiments of the disclosed invention will be understood more fully from the detailed description given below and from the accompanying drawings of embodiments of the invention, which, however, should not be taken to limit the invention to a specific embodiment but are for explanation of understanding only.

DETAILED DESCRIPTION OF THE INVENTION

Reducing selection time of text that varies widely from scene to scene in a simulated conversation program has been a significant challenge, particularly in the videogame industry. The typical approach has been to address the visual configuration of the interface. For example, pie menus, when used with an input device such as a mouse, can save time as compared to a drop-down list menu by reducing the distance the cursor must be moved to make a selection. Icons have been used to represent classes of character appearance for quick selection, and can conceivably be applied to dialog, however, this would limit the information provided to a user by not disclosing any portion of the text or a description of it beyond what an icon could disclose.

As is known in the art, consistent mapping of selectable options is the preferred format. For example, in a word processing program, the selections, "save," "open," "close," "exit," etc., are always presented in the same order, regardless of the document a user has accessed. Unfortunately, when dealing with phrases, sentences or other conversation segments, the same type of selectable mapping cannot be directly applied. The inventors, however, have devised a way by which the idea of consistent mapping can be applied to selecting phrases and sentences that vary from scene to scene.

A plurality of dialog classes is provided and a selectable conversation segment is provided for each class. The choice indicator presents each dialog class in the same position throughout at least a portion of the program. Preferably, this consistent mapping is used throughout the entire program so a user becomes familiar with positions of particular dialog classes. If not, it may, for example, be correlated to a specific character, so that each character will have its own unique positioning of classes on the choice indicator. This may be done, for example, if particular classes vary from character to character.

Figure 1:
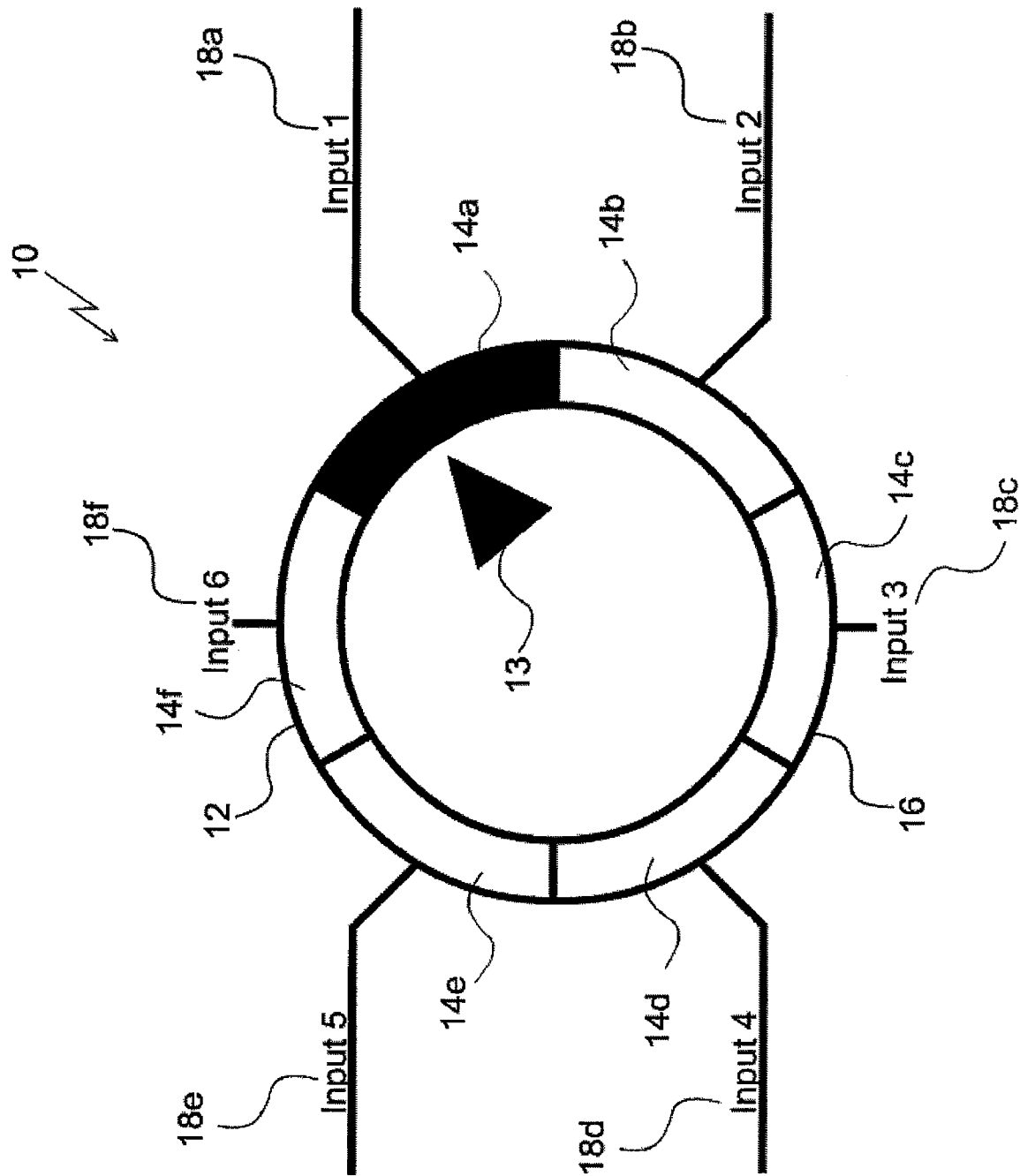
FIG. 1 shows a graphical interface for display on-screen during operation of a program, according to an illustrative embodiment of the invention.

FIG. 1 depicts a graphical interface 10 according to an illustrative embodiment of the invention. The graphical interface 10 is displayed on-screen during use of a computer program, enabling a user of the program to participate in a simulated conversation with the program, by means of which the user can select from among options presented by the program. Graphical interface 10 has a radial choice indicator 12 comprising a plurality of selectable slots 14a-f providing selectable options for responses 18a-f presented by the program.

The illustrative graphical interface embodiments shown in FIGS. 1-4 show slots 14a-f arrayed in sequence around a band 16. Optionally, a movable indicator 13 may be incorporated to indicate a selected slot 14. FIGS. 1-4 depict the band 16 as having circular geometry. It will be recognized that many different geometries are suitable and may be used, and that a different number of slots 14 may be used. Also, it will be recognized that alternative designs, such as a rectangle, pie design or a multi-pointed star design, may be substituted for the band 16 and are still considered to be in the spirit and scope of the disclosed invention.

Figure 2:
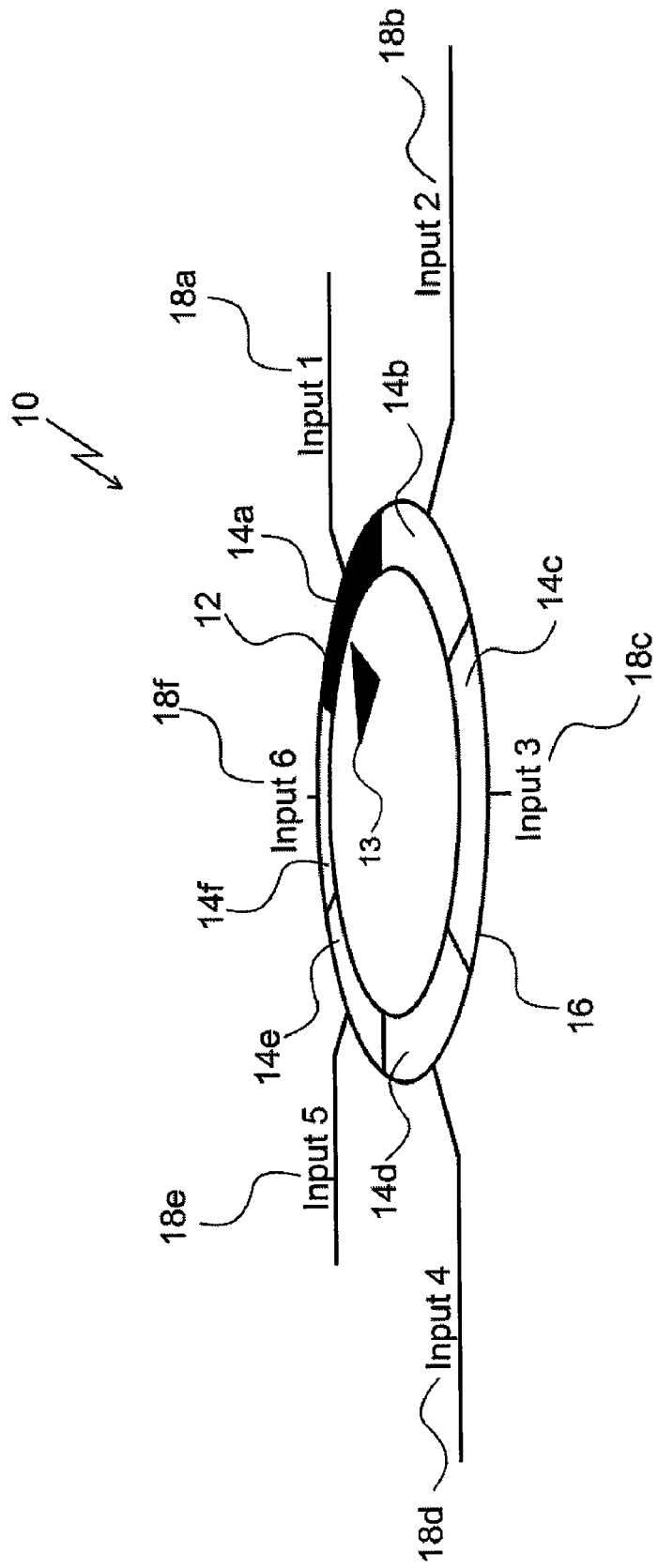
FIG. 2 shows an alternative geometry of a graphical interface suitable for use with a videogame, or the like, according to an illustrative embodiment of the invention.
Figure 4:
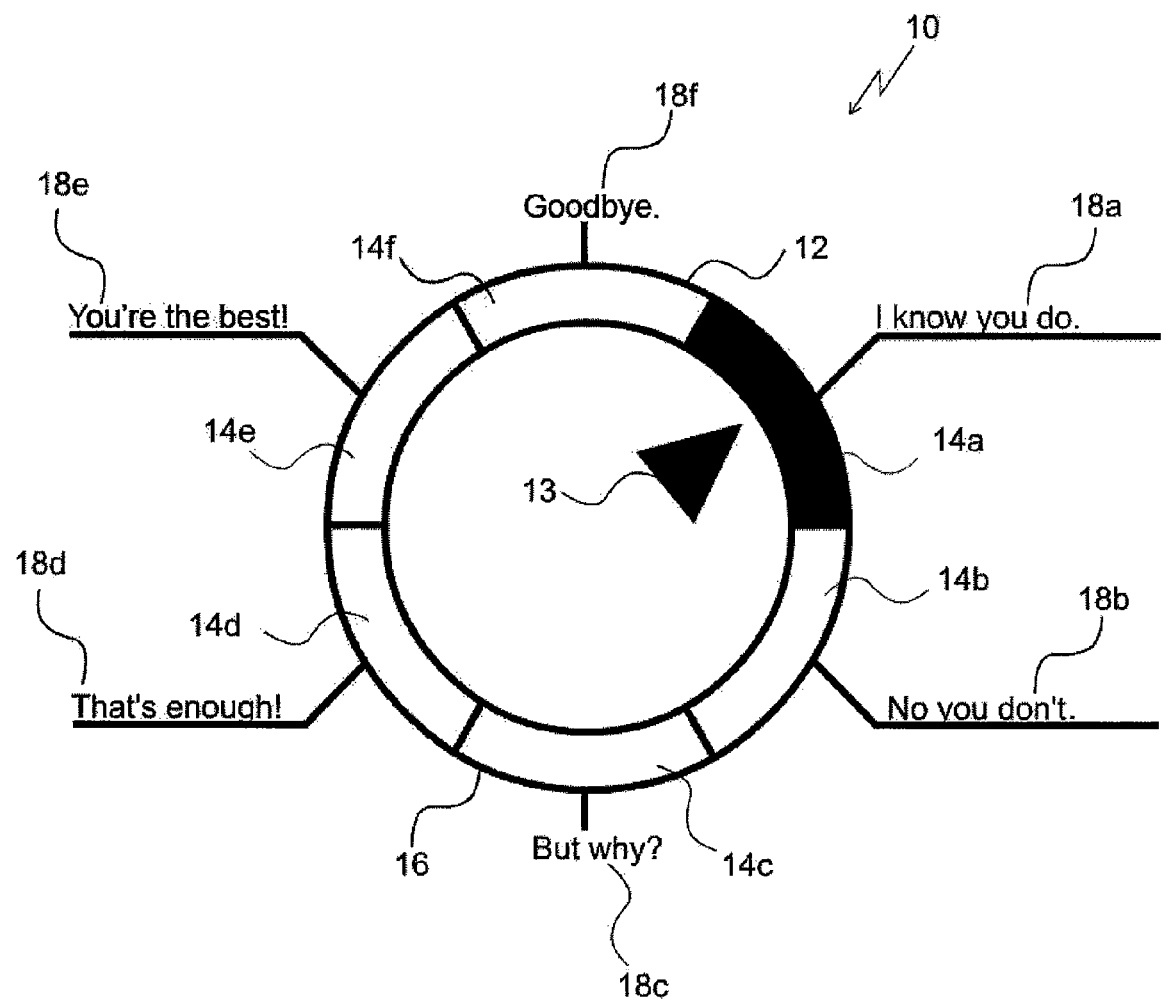
FIG. 4 illustrates a graphical interface as shown in FIG. 2, in which an example is displayed of a set of options for responses during a step in a simulated conversation in the videogame.

Preferably, the position of each selectable slot 14 correlates with a particular type or class of selectable option for response 18 for input into the program, shown as different selections of responses labelled 18a through 18f in FIGS. 1, 2 and 4. Through repeated use a user quickly becomes familiar with a position of a particular slot 14 corresponding to a class of response 18.

This consistent mapping of classes of selectable options to choice indicator positions may provide significant time savings as compared to conventional systems. The reduction in time required to select an option provides a pace that more closely approaches that of real life conversations.

The graphical interface 10 is particularly advantageous for use when playing of a videogame. It is noted, however, that embodiments of the present invention can be applied to other programs, such as, for example, training or testing programs. The graphical interface 10 is displayed on-screen during the videogame, to enable a player to select from among predetermined responses, thereby enabling the player to participate in a simulated conversation. The graphical interface 10 may be displayed at all times during a videogame, or only at selected times such as on those occasions when there is an opportunity or requirement for simulated conversation. The times at which the graphical interface appears may be determined by the program or by the user, or both.

Figure 3:
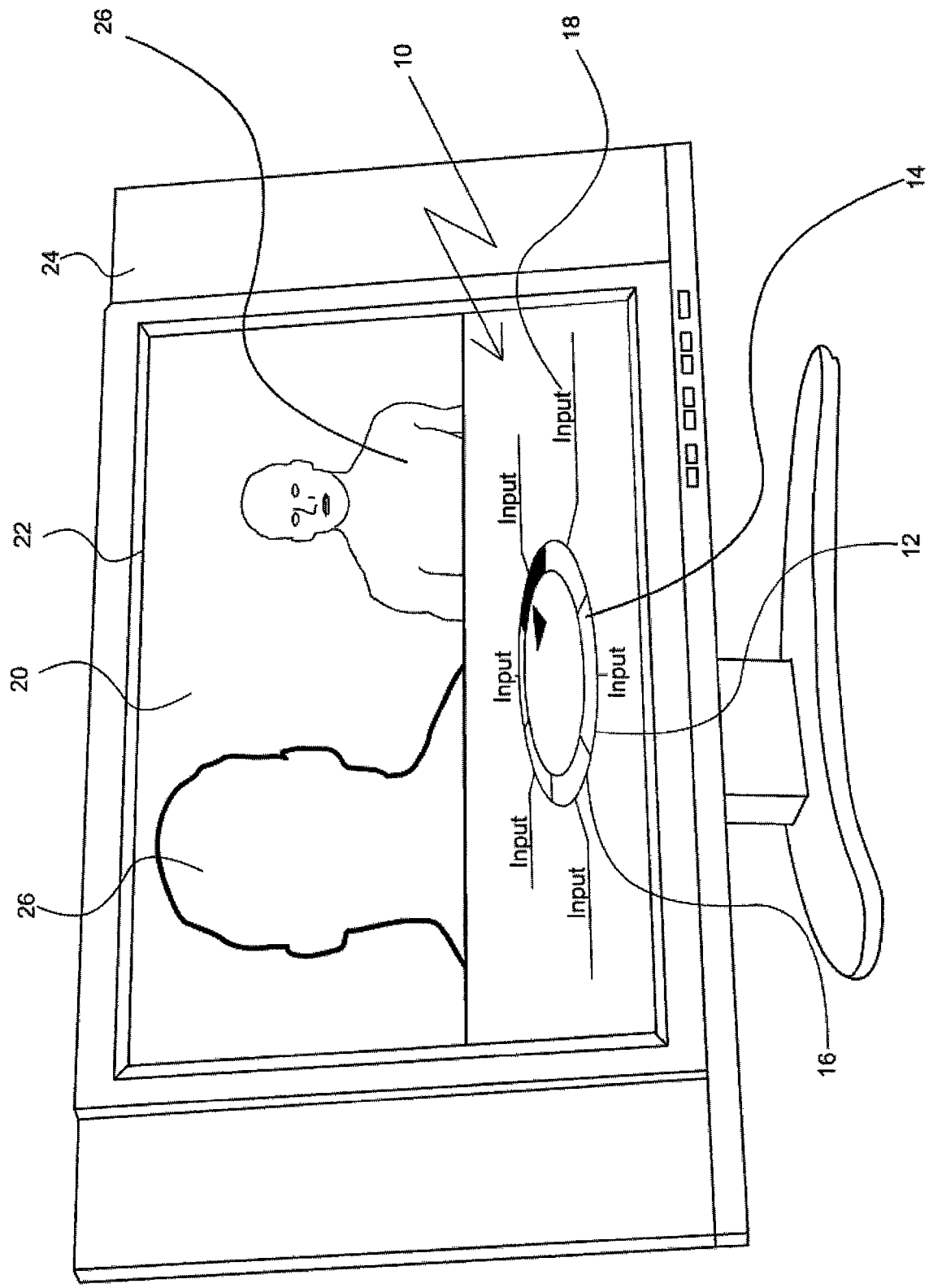
FIG. 3 is an illustration of the graphical interface shown in FIG. 2 displayed on a scene during a videogame according to an illustrative embodiment of the invention.

When used in a videogame, as illustrated in FIG. 3, each of slots 14 represents a different selectable option for response 18 to a component in a simulated conversation. FIG. 4 illustrates a set of possible responses 18 according to an illustrative embodiment of the invention.

Six slots 14 are illustrated in FIGS. 1 through 4. It can be seen that the number of slots 14 may be varied to address the requirements for different situations. However, for consistency and ease of use by a player in one or more videogames, it is preferable that the number of slots 14 remains the same throughout a videogame, and preferably throughout all videogame applications. It has been found through experience that use of six selectable slots 14 arrayed around the band 16 provides several advantages. When the number of slots 14 is consistently six and these are arrayed around an oval or circular band 16, a videogame player rapidly becomes familiar with the design and use of graphic interface 10, there is ease of use, and the six slots 14 provide capability to offer sufficient options among potential responses 18 in a simulated conversation.

A player of a videogame can select from among the responses 18 enabling the player to participate in a simulated conversation with characters within the videogame. Each of slots 14 provides a selectable response 18 for input into a simulated conversation with characters within the videogame. The input response 18 into the simulated conversation is preferably selected from a remark, as illustrated in FIGS. 3 and 4, an animate action, and/or a combination of remark and an animated action. The manner in which actions and dialog are indicated can differ to increase the speed by which a user can select an input. For example, dialog may be presented in quotes and action descriptions depicted without quotes. Additional differentiating features may be needed, if for example a combination of dialog and actions is also presented as a selection. Other illustrative differentiating features include, but are not limited to, colour and font.

To enable the player of a videogame to respond rapidly, the nature of the responses 18 at any one of slots 14a through 14f is similar in nature for each element of each conversation, i.e. can be categorized into a particular class of responses. It has been found through testing that players readily become familiar with and comfortable using the following options for assignment of six slots 14 for dialog choices comprising different types of response 18.

| DIALOG CLASS | PARAPHRASE | FIG. 4 REFERENCE NUMBER |
| --- | --- | --- |
| Agree | "I know you do" | 14 a |
| Disagree | "No you don't" | 14 b |
| Ask a question | "But why?" | 14 c |
| Hostile | "That's enough!" | 14 d |
| Friendly | "You're the best!" | 14 e |
| End Conversation | "Goodbye" | 14 f |

The chart above provides illustrative examples. In general, the classes can be any definable conversation segment type. The paraphrases can be any description or portion of the conversation segment they identify. Full conversation segments can also be displayed on the choice indicator.

Through the consistency of this arrangement, the player will know that a positive response 18 will always require selection of one particular slot 14 (for example, "Agree" response 18a corresponding to slot 14a in FIG. 2), and that a negative response will always require selection of a different slot 14 (for example, "Disagree" response 18b corresponding to slot 14b in FIGS. 2-4).

To further enhance the consistency of location of selections, the graphical interface can correlate with the configuration of buttons or other selection mechanisms on a control device. For example, if a control device has four buttons disposed in a circular configuration, the graphical interface can be a radial indicator with four slots. A mechanism to select the desired graphical interface configuration can be included so a user can choose one that most resembles the layout of the control device being used, or is otherwise most desirable.

In a particular embodiment of the invention, paraphrases appear in the slots while the associated full text appears at another location of the graphical interface, for example at the center of a radial interface. The full text will appear when a slot is highlighted or otherwise identified. A threshold time period, during which a slot is highlighted or otherwise identified, can be used to trigger appearance of the full text, or it can occur relatively instantaneously. If the text is extensive, the ability to scroll through it can be provided. Scrolling through the text can also be initiated by merely highlighting or otherwise indicating a slot over a period of time.

In a further embodiment of the invention, colours are used to identify the dialog classes. The colours can be used either alone or in conjunction with the text. Colours can help a user more quickly locate the desired class of text. To enhance that capability, the colours can correlate with the dialog class, such as having red for an angry response, yellow for a pleasant response, etc.

A slot can also be consistently used during at least a portion of the program to represent input from a character other than the main character. In an illustrative example, a representation of the character appears in a slot. The character appearing may differ, but it will always appear in the same slot. In a further embodiment of the invention particular characters appear in particular slots.

Referring to FIGS. 2-4, optionally, when response 18 is a remark, selection of a selectable slot 14 activates a voice-over vocalization of the selected remark into the simulated conversation.

Optionally, paraphrases can be assigned to each selectable slot 14.

It has been found from experience that graphic interface 10 is more easily used when selectable slot 14 is initially highlighted before selection, as illustrated in FIGS. 1 through 4. It has also been found that incorporation of movable indicator 13 enables a user to more readily identify which among slots 14 has been selected or can be selected.

Optionally, highlighting selectable slot 14 before it is selected during playing of a videogame initiates animated movements of the corresponding videogame character.

Optionally, selection of selectable slot 14 while another among the videogame's characters is speaking causes that videogame character's remarks to be cut-off, which provides an effect that more closely simulates a real life conversation as compared to conventional programs.

Referring to the illustrative embodiment of FIG. 3, a scene 20 is being displayed on a screen 22 of a viewing device such as a monitor 24. The characters 26 in scene 20 have information the player needs to continue to progress in the videogame. To access the information, the player needs to engage the characters in a simulated conversation.

The contributions by one or more videogame characters 26 to a simulated conversation can be effected through on-screen dialog, using bubbles, captions or menus, or through pre-recorded voice-over vocalizations, or both, all of which are familiar within the art. When, during a role playing game using pre-recorded voice-overs, the player selects a remark from among options presented by graphical interface 10, that player's own character 26 will "speak" the remark, and an audible simulated conversation will be conducted.

Figure 5:
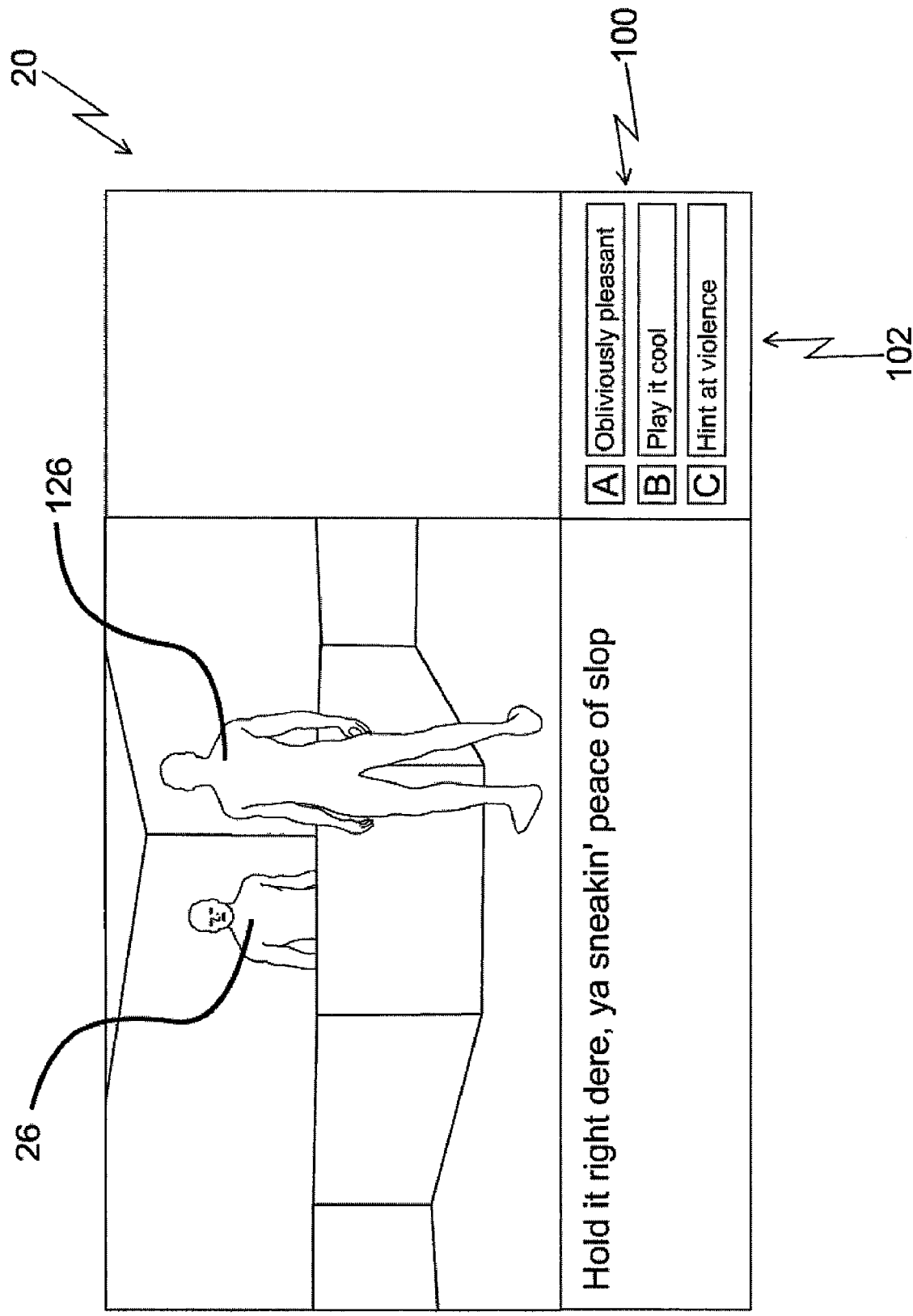
FIG. 5 is a scene from a prior art videogame titled "The Pandora Directive" showing text of a conversation and options for attitude.
Figure 6:
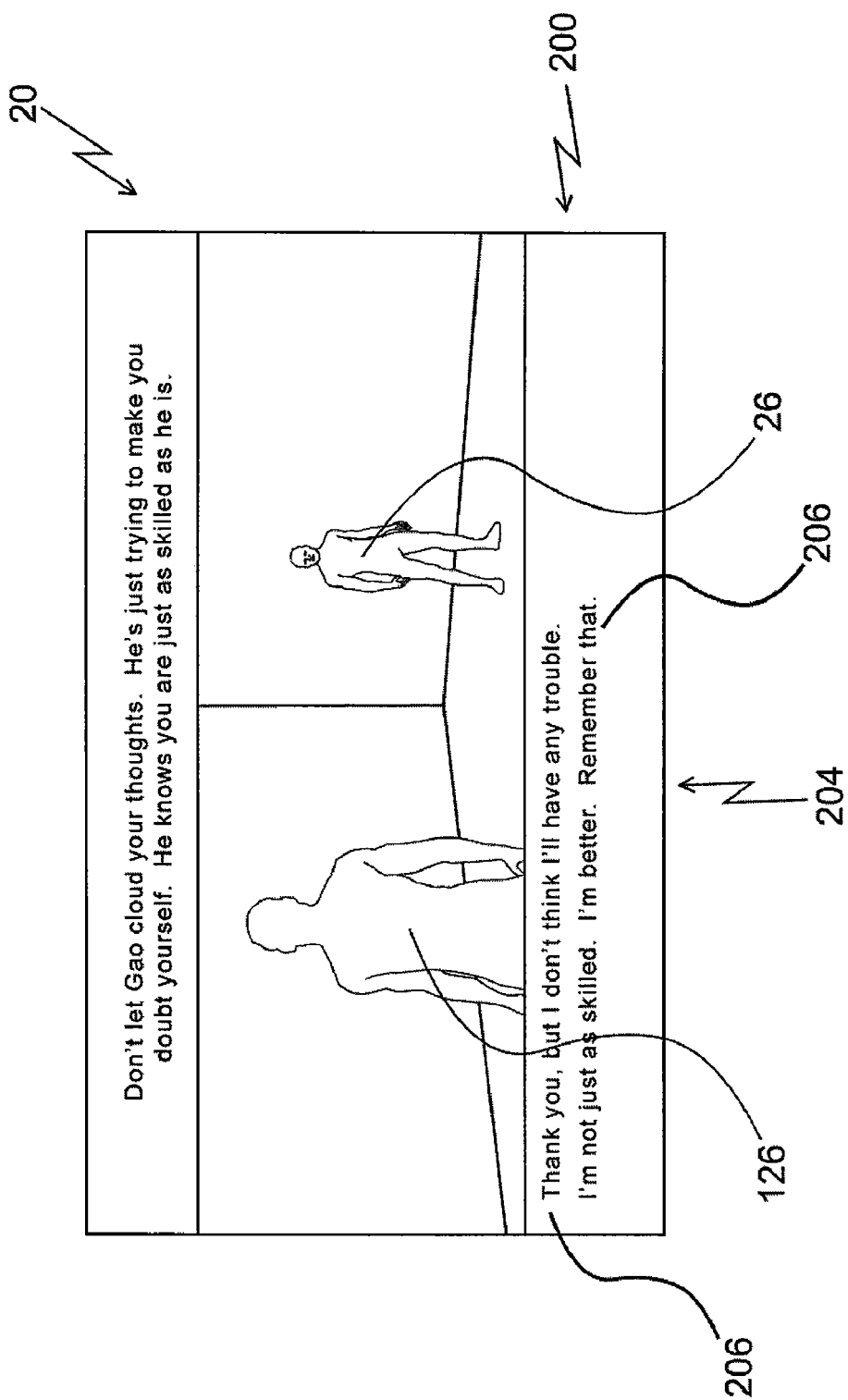
FIG. 6 is a scene from another prior art videogame titled "Jade Empire" showing text for selection of contributions to a conversation.
Figure 7:
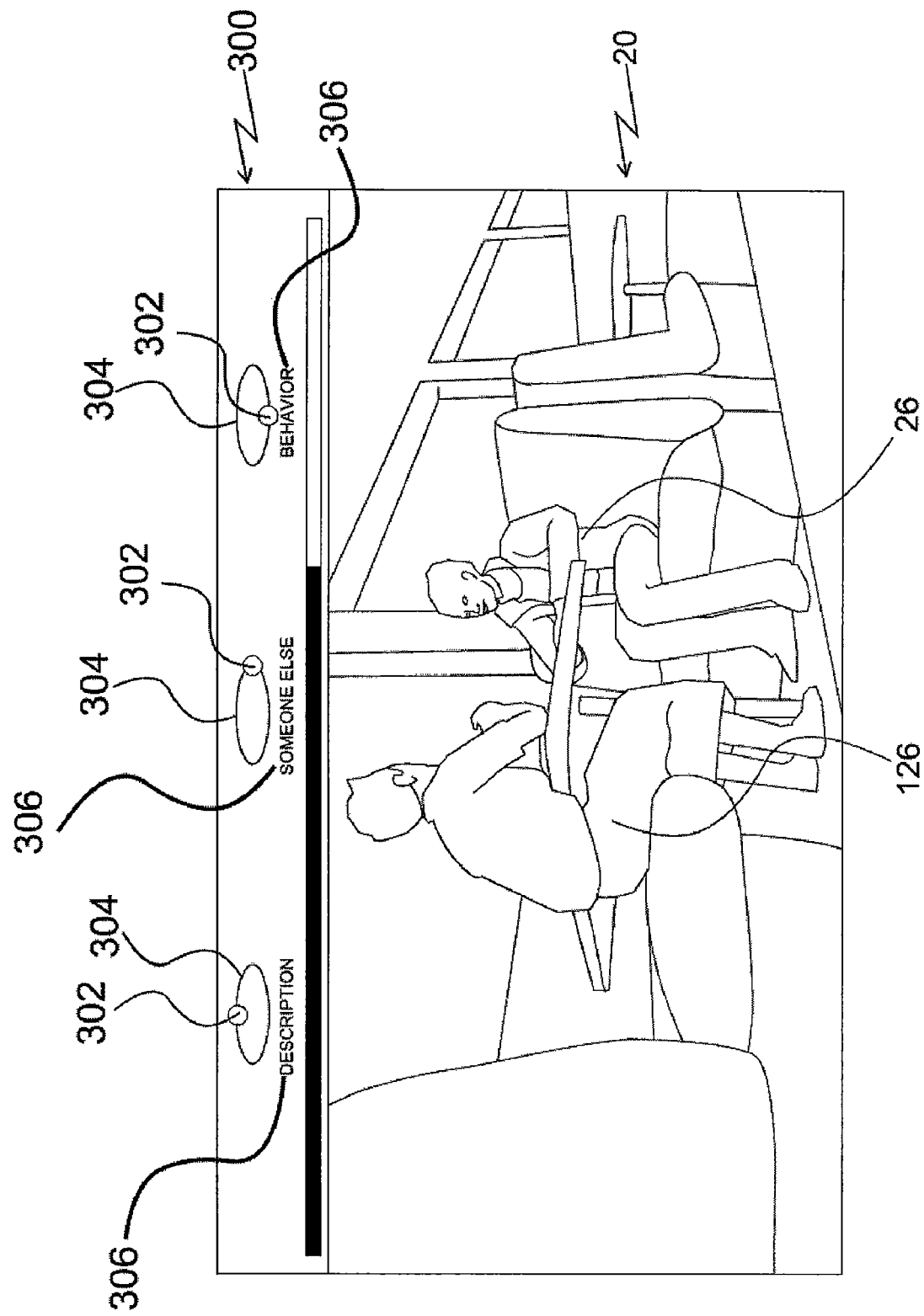
FIG. 7 is a scene from yet another prior art videogame titled "The Indigo Prophecy" showing options for selecting among types of conversational dialog.

Some advantages of embodiments of the present invention will now be demonstrated by comparison with typical examples of prior art interfaces used in videogames as depicted in FIGS. 5-7.

Referring to FIG. 5, a first type of prior art interface 100 is exemplified in the recent videogame "Pandora Directive." A scene is reproduced as a line drawing. Players are given a vertical list of "themes" 102 that describe each available dialog line. When a player makes a choice, the player-controlled character 126 is shown speaking the chosen line through the use of voice-over. Since the actual text of each dialog lines is not listed in full, the player is able to make a faster decision and can enjoy listening to the player-controlled character 126 speaking the chosen line. A drawback to the use of this type of interface system 100 is that the choices and inputs are different each time, so the player cannot learn to instinctively respond—thus causing some delay in player response and preventing the feeling of intuitively responding as part of a natural conversation between player-controlled character 126 and other characters 26.

Referring to FIG. 6, alternatively, a second type of prior art interface 200 used in some videogames simply lists the available dialog options that are available to the player at the current point in the conversation, as illustrated by a line drawing of a scene 20 from the videogame "Jade Empire." In many such videogames, players are presented with interface 200 comprising a vertical list of dialog lines 204, written out in their entirety. Other recent typical examples of such videogames include "Star Wars: Knights of the Old Republic". The player reads through each of lines 204, then chooses the one that they wish player-controlled character 126 to speak. Since the player must read through each entire line 206, the decision takes a considerable amount of time, and once the player makes a choice, the chosen line 206 is already known in full—thus making it redundant to play an audible voice-over line.

FIG. 7 depicts a third type of prior art interface 300. In the third type of prior art interface 300, players can use an analog input such as a thumbstick on an Xbox® controller to select options 302 placed around the outside of indicators 304, shown in FIG. 7 as an oval. FIG. 7 shows a line drawing of a scene from one example of the videogame "The Indigo Prophecy" using the third type of prior art interface 300. In this videogame, players are presented with several dialog options 302, each represented by a very brief description 306 of its response type. In this example, indicator 304 is above each description 306. A direction the player must push on the thumbstick to choose option 302 is shown as a bright spot on indicator 304. This interface system 300 also has the drawback of inconsistent mapping of inputs to response types, resulting in a lack of clarity about what is meant by the short paraphrases 306 used to present options 302.

The drawbacks of prior art interface systems 100, 200, 300 can be reduced by embodiments of the present invention, such as by graphical interface 10 shown in FIGS. 1-4. Because it provides a consistent mapping of inputs to response types, graphical interface 10 allows the player to make informed choices relatively quickly, thus enabling the system using interface 10 to simulate verbal conversation at a pace similar to that of real-life conversations.

The consistent mapping of interface 10 may also work to enhance the effect of using paraphrases instead of complete dialog lines. In a system without consistent mapping, as illustrated by FIG. 7 for the third prior art interface 300, short paraphrases of lines can be very difficult for the player to decipher. Consider an example where the player-controlled character 126 is asked to do a job for another in-game character 26. In a game that uses an interface with inconsistent mapping, a dialog line with a paraphrase of, for example, "Someone else" may not provide enough information for the player to understand what the corresponding dialog line would entail. When using the graphical interface 10 of the present invention however, the player will see that each of selection of dialog responses 18a-18f sits in one of the consistently-mapped dialog slots 14a-14f. In FIG. 7, for example, the player may see that it is in the "Hostile" slot 14d, thus implying that the line will involve a response 14 where the player aggressively demands that the other character find someone else to do the job.

An illustrative embodiment of the method of use of the graphical interface 10 will now be described. The graphical interface 10 can be used for many videogame applications. The graphical interface 10 is particularly useful for games in which the player-controlled character 126 engages in branching dialog conversations with in-game characters 26. Selection of a particular response by selection of one of slots 14 determines the next part of the conversation or, in a different context, the next component within the videogame.

A menu, such as a radial menu can present selectable input in terms of two or more axis. For example, the choices presented horizontally can be agree and disagree, so that opposite classes appear opposite one another along an axis. The choices presented vertically can be, for example, continue conversation and exit conversation, so again opposite classes are opposite one another. This is only one example of an implementation of the system of interface 10, which can be adapted to a variety of interfaces and numbers and positions of classes of response 18.

The graphical interface and associated programming can be designed so a user can choose the position of each dialog class. The user may also choose the dialog classes to be presented on the graphical interface by being provided with a list of classes or groups of classes.

Control input is effected by selection from among responses 18 represented by slots 14. By assigning specific control inputs to specific classes of response, always using the same slot 14 for the same type of response 18, a player can learn to instinctively respond to an in-game character. Especially when dialog lines are implemented as playback of pre-recorded voice-over, this system enables the player to be in control of a real-time, branching conversation where game characters 26, 126 speak to each other audibly and at the pace of a normal conversation.

The use of highlighting selected slot 14, indicator 13, or the combination of indictor 13 and highlighting slot 14 enables a videogame player to readily and rapidly identify which among slots 14 is selected for activation.

One preferred example of use of graphical interface 10 for use in a videogame will now be described. In addition, a series of optional elements may be included to enhance the utility and versatility of graphical interface 10, and the enjoyment of a videogame by players.

The illustrative embodiments of graphical interface 10 for use with videogames are readily utilized by use of a videogame console's analog thumbstick and button. In one protocol for using these elements, the player can rotate the thumbstick to highlight a slot 14, and/or to move indicator 13 to identify slot 14, for a response selected from among dialog classes 18a-18f, and press the button to engage the dialog response 18.

It will be recognized that other types of human interface controller, including, but not limited to, a joystick, touchpad, or a keyboard can be used to enable a user to interact with graphic interface 10. Embodiments of the graphical interface, however, are particularly suitable to be used with a directional input device, such as a joystick, as opposed to a non-directional device such as a mouse. The immediacy and definitiveness of a directional input device serves to facilitate the selection speed. A non-directional input device, such as a mouse, must be moved to a particular point or range of points. To be sure that range will not be overshot, the mouse must be moved at a slower rate compared to the rate at which a directional device can be moved. Accordingly, for most applications, embodiments of the invention are preferably used with a console device having a directional input. A non-directional input device, such as a mouse, however, can still be used with embodiments of the invention.

The embodiment illustrated in FIG. 4 associates paraphrases of the dialog lines 18 that are available for selection with their respective dialog choice slots 14. This allows the player to get a more specific idea about what the corresponding dialog line 18 will say, without requiring the player to read the entire text of dialog line 18.

Optionally, in periods during the videogame when the player is not permitted to engage a dialog choice (for example, because another character is speaking), graphical interface 10 can be used by the player to make an input, which can be used to play appropriate animations on the player-controlled character 126. For example, while another character 26 is saying something with which the player disagrees, if the game presently is not ready to accept a dialog choice from the player, the player can engage a "disagree" input causing the player-controlled character 126 to play a "disagree" animation. This enhances the player's sense of immersion in the game by permitting the player to act out their feelings even before they select a dialog line.

The radial menu shown as graphical interface 10 in FIGS. 1-4 allows players to highlight and/or indicate a choice of response 18 before selecting it. Optionally, this two-stage selection method allows players to put their character 126 into an animation state corresponding to the highlighted slot 14 before the game is ready to receive the input of a dialog response 18.

By allowing the player to engage a control input before the other game character 26 is finished speaking a dialog line, the player can "cut off" that game character 26 in mid-speech, thereby simulating a behaviour that is sometimes desirable in a real-life conversation.

Figure 8:
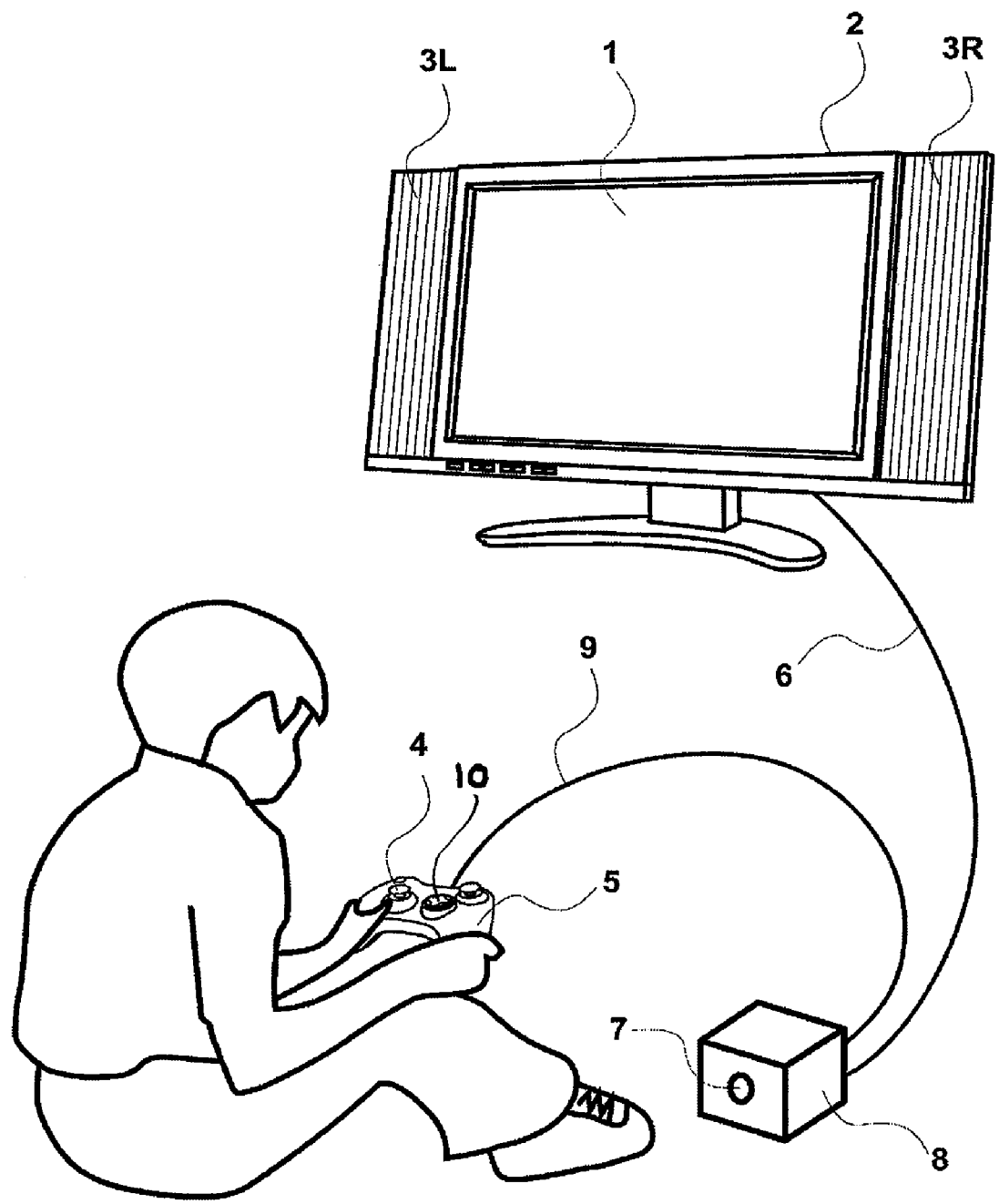
FIG. 8 is an interactive computer game system according to an illustrative embodiment of the system.

FIG. 8 depicts an interactive computer game system according to an illustrative embodiment of the system. A support structure 2 contains a display 1 and right and left speakers (audio projection device) 3R, 3L. Display 1 can be any display mechanism compatible with the system and having the ability to display graphical interface. A television can, for example, serve as a display device. Display 1 is functionally connected to a hardware platform (such as a computer or gaming console) 8 by an audio/visual cable 6. The hardware platform 8 is functionally connected to controller 5 by cable 9. The Hardware platform preferably has a power switch 7 and is connected to, or contains, a power supply (not shown). The player interacts with the software using the controller 5, by moving the analog stick 4 or pressing buttons 10

Figure 9:
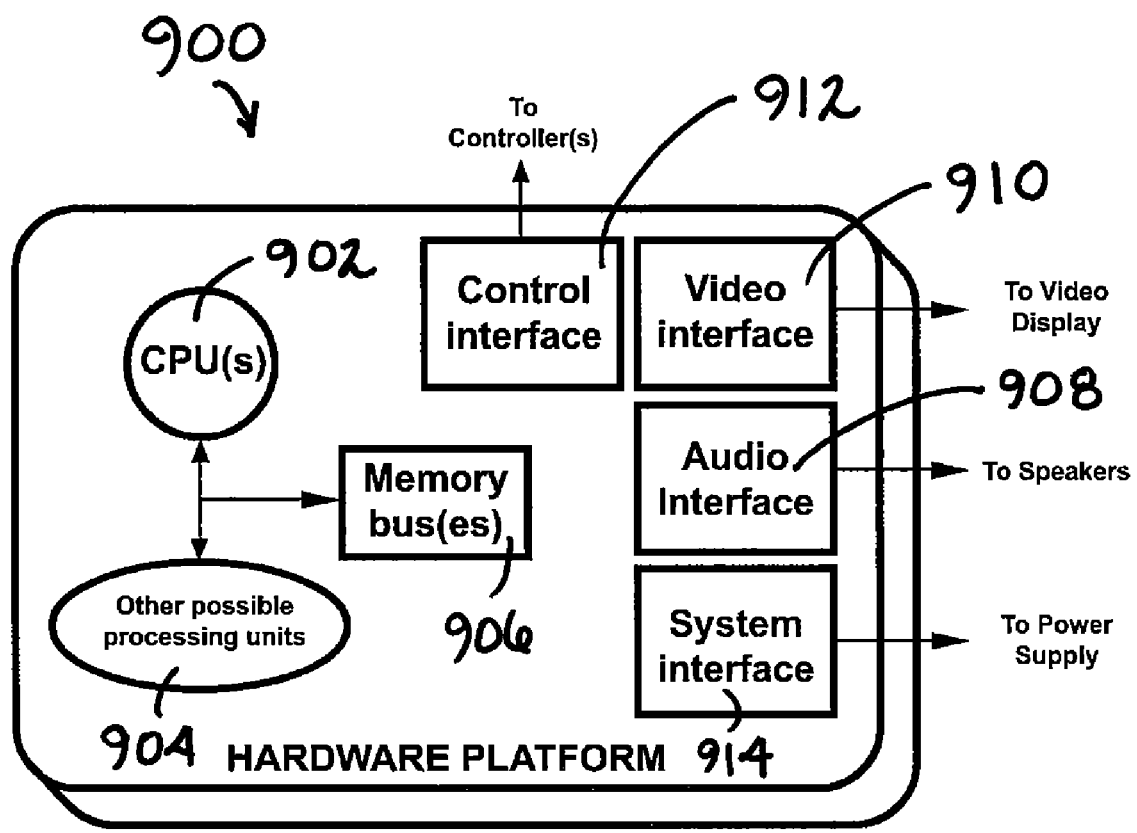
FIG. 9 is a schematic of an interactive computer system according to an illustrative embodiment of the invention.

FIG. 9 is a schematic of an interactive computer system according to an illustrative embodiment of the invention. The schematic represents a generalized system 900 commonly found in a computer or gaming console that would support a software program that operates embodiments of the innovation. A central processing unit (CPU) 902 works with other processing units 904 to conduct the basic mathematical and logical operations required by the software code. The CPU(s) work with one or more memory buses 906 that allow storage and retrieval of software data. The software that is running on the CPU(s) communicates with an audio/video interface 908, 910 that allows output of visual display and sound that are generated by the software. The software can also receive control inputs through a control interface 912 which provide user inputs to the software. A system interface 914 receives power to operate the various components from a power supply. It is noted that other system configurations can be used to implement embodiments of the invention, including, but not limited to, handheld devices such as personal digital assistance (PDA) devices, pocket personal computers (PCs), telephones, and handheld videogame devices, such as Game Boys.

Figure 10:
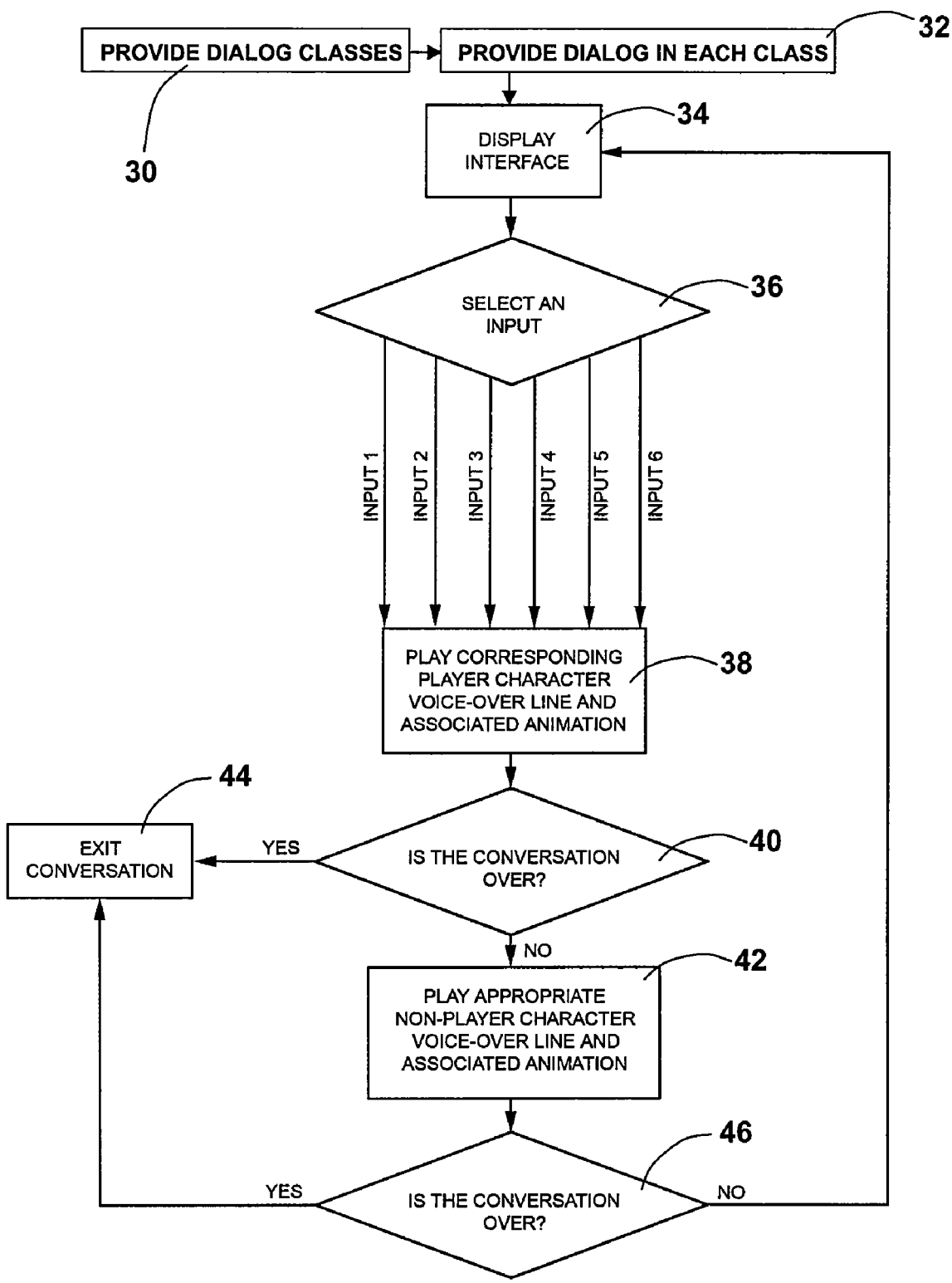
FIG. 10 is a flow chart showing a method of creating conversation in a computer program according to an illustrative embodiment of the invention.

FIG. 10 is a flow chart showing a method of creating conversation in a computer program according to an illustrative embodiment of the invention. A plurality of dialog classes is provided in block 30. In block 32, dialog is assigned to each of the classes. The order of these steps can be reversed. The dialog includes conversation segments, which can be one or more words, phrases and/or sentences. It is preferable for each class to contain dialog, however, it is not mandatory, and thus, one or more classes may appear blank. Leaving a blank space maintains the mapping consistency. At other points of the program dialog classes may be removed.

Block 34 indicates the display of the graphical interface, which provides a choice indicator so a user may select a dialog input. Each slot is associated with a dialog class and, when selected provides a dialog choice. In block 36, via the graphical interface, the user chooses from the six selectable slots corresponding to inputs 1-6. Although six slots have been shown to be an optimum number for many applications, other numbers of choices may also be used. The slot can be designated by one or more words to indicate the nature of the dialog without revealing the entire conversational segment. Alternatively, the entire dialog can be revealed. The graphical interface is consistent as to the position of dialog classes throughout at least a segment of the program so the user becomes familiar with the location of particular types of response, thereby minimizing selection time.

Once a dialog choice is made, the corresponding character voice-over line is played and associated animation is displayed (block 38). In block 40, it is determined whether the conversation has ended. This can be by user selection or software instructions. If the conversation is not over, then voice-over lines are played for a non-player character and any associated animation is displayed as shown in block 42. The conversation is exited in block 44 whenever the conversation is over. This determination is made after each player character and non-player character speaks, displays animated movement or otherwise carries out an action or is cut-off from an action by a user input or software direction. So, for example, the determination of whether the conversation is over is made again in block 46.

The invention further includes a computer readable medium for executing the method and displays described herein.

While the invention has been described by illustrative embodiments, additional advantages and modifications will occur to those skilled in the art. Therefore, the invention in its broader aspects is not limited to specific details shown and described herein. Modifications, for example, to the visual appearance of the graphical interface, the type of program in which the interface is utilized and the types of dialog classes may be made without departing from the spirit and scope of the invention. Accordingly, it is intended that the invention not be limited to the specific illustrative embodiments, but be interpreted within the full spirit and scope of the appended claims and their equivalents.

What is claimed is:

1. A computer program for a computer system, wherein the computer program resides on a non-transitory medium, the computer program configured to present a graphical interface to be displayed during execution of the computer program, enabling a user of the computer program to participate in a simulated conversation with the computer program, the computer program comprising:

program code for managing a plurality of possible dialog responses, at least some of which have a stored associated definable conversation segment type;

program code for generating a displayable choice indicator, wherein the displayable choice indicator indicates directional choices selectable by the user;

program code for reading from memory an indication of a definable conversation segment type associated with each of a set of the directional choices;

program code for generating dialog responses associated with each of the set of directional choices, wherein a given dialog response is associated with a given directional choice when the definable conversation segment type of the given dialog response matches the definable conversation segment type of the directional choice;

program code for receiving an input indication from the user, wherein the input indication corresponds to a directional choice wherein the stored associated definable conversation segment type for each possible dialog response corresponds to an emotion related to the dialog response, wherein the definable conversation segment type associated with each of a set of the directional choices also corresponds to an emotion such that, over a plurality of user interface displays, the program code for generating dialog responses repeatedly places possible dialog responses that relate to the same emotion with the same directional choice, thereby providing the user with a consistent location for selecting dialog responses corresponding to a particular emotion.

2. The computer program of claim 1, wherein the displayable choice indication is a radial choice indicator or a rectangular choice indicator.

3. The computer program of claim 1, wherein the directional choices are indicated by elements in a band.

4. The computer program of claim 1, wherein the displayable choice indicator includes six selectable slots.

5. The computer program of claim 4, further comprising program code to have the selectable slots visually identified before selection by highlighting or by a movable indicator.

6. The computer program of claim 4, further comprising program code to have the selectable slots visually identified before selection by highlighting or by a movable indicator.

7. The computer program of claim 1, wherein the computer program is part of a videogame.

8. The computer program of claim 1, wherein selectable slots of the displayable choice indicator provide options for input into a simulated conversation with characters within a videogame; and wherein the input into the simulated conversation is selected from a group of remarks.

9. The computer program of claim 1, wherein selectable slots of the displayable choice indicator provide options for input into a simulated conversation with characters within a videogame; and wherein the input into the simulated conversation is selected from a group of remarks.

10. The computer program of claim 1, wherein consistency of the graphical interface as to the position of dialog responses and their associated definable conversation segment type correlates to a specific character.

11. The computer program of claim 1, wherein selectable slots of the displayable choice indicator activate voice-over vocalizations of selected remarks into the simulated conversation.

12. The computer program of claim 1, wherein paraphrases or colours are assigned to one or more selectable slots of the displayable choice indicator.

13. The computer program of claim 1, wherein program code for visually identifying a selectable slot of the displayable choice indicator before it is selected includes program code to initiate animated movements of a character.

14. The computer program of claim 1, wherein program code for selection of a selectable slot of the displayable choice indicator for a first character while a second character is speaking includes causing the first character's remarks to be cut off.

15. The computer program of claim 1, wherein full text appears when a slot of the displayable choice indicator is identified.

16. The computer program of claim 1, further comprising program code to display one or more additional selectable slots of the displayable choice indicator beyond a base set of slots, each of the additional slots providing a class of action choice when selected.

17. The computer program of claim 16, wherein program code provides that the action choices are differentiated from the dialog choices in appearance.

18. The computer program of claim 1, wherein one or more selectable slots of the displayable choice indicator provide a character choice.

19. The computer program of claim 1, wherein the configuration of the graphical interface correlates with configuration of a control device used for the selection of slots.

20. The computer program of claim 1, wherein the corresponding emotions include "hostile" and "friendly" and the graphical user interface includes a first directional choice that is usable for selecting a presented hostile dialog choice and a second directional choice that is usable for selecting a presented friendly dialog choice, wherein the first directional choice is associated with different hostile dialog choices at different points in the execution of the computer program and the second directional choice is associated with different friendly dialog choices at different points in the execution of the computer program.

21. A method of creating conversation in an interactive computer system including at least one user input device and a display device capable of displaying a graphical interface, the method comprising:

providing data corresponding to a plurality of classes of dialog, wherein each class of dialog has at least one associated definable conversation segment type;

assigning a conversation segment to each class of dialog;

providing a graphical interface displayed during operation of a program;

providing a choice indicator on the graphical interface, wherein the choice indicator has a plurality of directional choices, each associated with a dialog class, each of the directional choices providing a dialog choice when selected, wherein the dialog choices provided in a given directional choice have an associated definable conversation segment type that matches an associated definable conversation segment type of the given directional choice throughout at least a segment of the program wherein the at least one definable conversation segment type for each class of dialog corresponds to an emotion related to the class of dialog, wherein the definable conversation segment type associated with each of the directional choices also corresponds to an emotion such that, over a plurality of user interface displays, dialog responses from a class of dialog appear with a same directional choice, thereby providing the user with a consistent location for selecting dialog responses corresponding to a particular emotion.

22. The method of claim 21 wherein the choice indicator is radial or rectangular.

23. The method of claim 21 wherein the directional choices are arranged in a band.

24. The method of claim 21 wherein the directional choices comprise six selectable slots.

25. The method of claim 21 wherein the directional choices are visually identified before selection by highlighting.

26. The method of claim 21 wherein the directional choices are visually identified before selection by a movable indicator.

27. The method of claim 21 wherein the program is a videogame.

28. The method of claim 21 wherein each directional choice provides an option for input into a simulated conversation with characters within the videogame; and
the input into the simulated conversation is selected from a group of remarks.

29. The method of claim 21 wherein each directional choice provides an option for input into a simulated conversation with characters within the videogame; and
the input into the simulated conversation is selected from a combination of a group of actions and remarks.

30. The method of claim 21 comprising consistently correlating the position of dialog classes to a specific character.

31. The method of claim 21 wherein selection of a directional choice activates a voice-over vocalization of the selected remark into the simulated conversation.

32. The method of claim 21 wherein paraphrases are assigned to one or more of the directional choices.

33. The method of claim 21 wherein colours are assigned to one or more of the directional choices.

34. The method of claim 21 wherein visually identifying a directional choice before it is selected initiates animated movements of a character.

35. The method of claim 21 wherein selection of a directional choice for a first character while a second character is speaking causes the first character's remarks to be cut off.

36. The method of claim 21 further comprising:
providing full text when directional choice is identified.

37. The method of claim 21 further comprising; providing one or more classes of actions;
assigning an action description to each class;
wherein directional choices are associated with the action classes and the graphical interface is consistent as to the position of the action classes throughout at least a segment of the program.

38. The method of claim 37 further comprising differentiating the action choices from the dialog choices by their appearance.

39. The method of claim 21 further comprising providing one or more directional choices having a character choice.

40. The graphical interface of claim 1 wherein the configuration of the graphical interface correlates with the configuration of a control device used for the selection of slots.

41. A computer readable medium programmed to carry out the method of claim 21.

42. A computer system configured to carry out the method of claim 21.

43. A computer system comprising:
a central processing unit to carry out operations of a software program, the software program capable of carrying out the method of claim 21; one or more memory devices to allow storage and retrieval of the software data;
a control interface functionally connected to the CPU to provide user inputs to the software;
an audio interface in communication with the software to provide audio output;
a video interface in communication with the software to provide visual output;
a display device to display the visual images from the software program and the graphical interface; and
audio projection device to project audio from the software program.

44. The method of claim 21, wherein the corresponding emotions include "hostile" and "friendly" and the graphical user interface includes a first directional choice that is usable for selecting a presented hostile dialog choice and a second directional choice that is usable for selecting a presented friendly dialog choice, wherein the first directional choice is associated with different hostile dialog choices at different points in the segment of the program and the second directional choice is associated with different friendly dialog choices at different points in the segment of the program.

* * * * *